H. J. BUBENHEIM.
UNIVERSAL JOINT.
APPLICATION FILED MAY 3, 1915.
1,188,406.
Patented June 27, 1916.
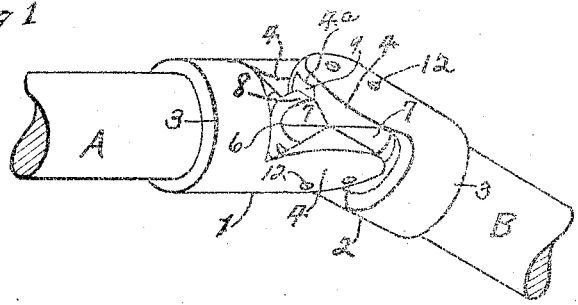
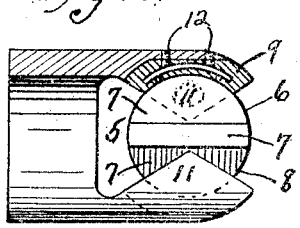
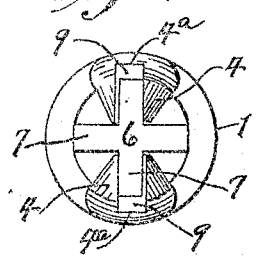
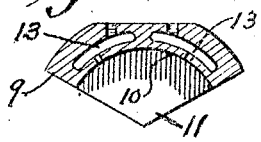
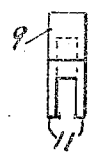
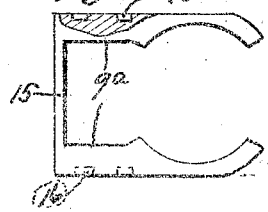
WITNESS.
R. F. Dilworth
INVENTOR
Henry J. Bubenheim
By H. W. Stevenson
Attorney

UNITED STATES PATENT OFFICE.

HENRY J. BUBENHEIM, OF PITTSBURGH, PENNSYLVANIA.

UNIVERSAL JOINT.

1,188,406.  Specification of Letters Patent.  Patented June 27, 1916.

Application filed May 3, 1915. Serial No. 25,450.

*To all whom it may concern:*

Be it known that I, HENRY J. BUBENHEIM, a citizen of the United States, residing at Pittsburgh, in the county of Allegheny and State of Pennsylvania, have invented a certain new and useful Improvement in Universal Joints, of which the following is a specification.

This invention pertains to the art of universal joints which afford a flexible connection between two rotatable members, usually employed in conjunction with the driving shaft of various mechanisms wherein it is desired to join the ends of two shafts in rotative angular relationship one with the other.

The practical advantages of this invention reside in the new and novel arrangement of parts whereby an interlocking feature is provided between the coacting parts, the maximum of bearing surface being secured and equally distributed.

Another advantage resides in the compactness and strength of the assembled device, its construction being such that the full diameter, which is approximately uniform throughout the entire length, can be materially reduced without weakening the structure.

A still further advantage lies in the means employed for preventing longitudinal displacement or separation of the coacting elements of the device, together with a self lubricating means, also a modified feature whereby the joint is made specially adaptable for motor driven vehicles, wherein longitudinal play in a limited degree is provided for in order to accommodate or provide for variable distances between the driving connection and the driven part of the mechanism.

In the accompanying drawings which illustrate one embodiment of the invention Figure 1 is a perspective view of the assembled joint in union with two shaft sections: Fig. 2 is a side view partly in section of one of the connecting members between its jaws being seated a pivotal member: Fig. 3 is an end view of the same: Fig. 4 is a sectional view of one of the shoe members: Fig. 5 is an end view of a bifurcated form of shoe, and Fig. 6 shows means for uniting the shoe members in pairs, said view being partly in section and showing means for limiting longitudinal adjustment.

Constructively my invention involves two main members or couplers, 1 and 2, respectively, these two parts being practically identical in size and configuration, each one having a socketed outer extremity 3 to receive and house the shaft sections A and B, together with the inner disposed integral extensions or jaws 4, which said jaws are diametrically opposite each other and lie in parallel horizontal alinement, being divided by the intervening space 5, the inner face of each jaw being slotted longitudinally.

When the two members 1 and 2 are brought together as shown in Fig. 1, the two pairs of jaws will interlock with each other and surround a centrally disposed pivotal member 6, made in the form of a cross, which member is provided with four radial flanges or spiders 7, that are spaced apart an equal distance from each other, and are designed to seat in the slots 4ª formed in said jaws.

The outer free edge or periphery of these flanges are made with a predetermined curvature or arc of a circle, as at 8, in order to permit a free rocking movement of the two main members to a limited degree when assuming their relative angular positions with respect to said pivotal member and to each other.

As a means for retaining the central member 6 in its coöperating relationship with the main members, and for preventing any longitudinal displacement or separation of these said main members away from said element 6, I have provided the shoe members 9, one for each of the grooves 4ª, a detail thereof being shown in Fig. 4, involving a curved bearing portion 10 having approximately the same arc of a circle given to the edge 8 of said flanges, also a depending lip or extension 11, which is designed to lie in close parallel alinement and contact with one or both sides of the said flanges 7. This extension part of each shoe serves as a bearing or replaceable lining to take up the wear incidental to the frictional engagement of the said flanges 7, only one extension being required when the joint is rotated in but one direction, said shoes carrying two extensions of a bifurcated nature, as shown in Fig. 5, which straddle the flanges 7, thereby providing a replaceable wearing surface at both sides, when the joint is designed to be rotated in reverse directions. These shoes are placed on the said flanges prior to the subsequent assembling of the two main members, afterward being removably held in their respective slots 4ª by screws 12, or other substitute means.

In adapting this coupling in conjunction with the driving mechanism of motor vehicles a limited longitudinal play or adjustment residing in the joint itself is advantageous in order to compensate for the variable distances between the driving connection and the driven part of the machinery. This feature is amply provided for in the member shown in Fig. 6, which involves furnishing the two shoe members with an extension part 9ª and uniting the same by a connector 15, which integral member seats in the grooves 4ª and is permitted a limited longitudinal movement, determined by the length of the slots 16 formed in said shoes or extension portions, the ends of the screws 12, which enter said slots, serving to prevent entire separation of the coacting parts. The two main members 1 and 2 are in this manner permitted a limited separation while still in pivotal relationship with the central member 6, at the same time being automatically self centering and free to assume their relative angular positions.

As a self lubricating feature of the joint I have provided pockets or recesses 13 in each of the shoe members which can be supplied with oil or other suitable lubricant through the threaded apertures which admit the ends of the said screws 12, additional apertures being supplied for escape of the lubricant to its proper and desired spot.

The slotted section of each jaw is of such a depth and configuration as to embrace and surround the major portion of the said radial flanges, the extreme inner edge of these jaws reaching approximately to the hub of said pivotal member 6, whereby the maximum of bearing surface will be present to insure strength, and guard against breakage incidental to the thrust imparted to these coacting elements while the main members are in rotative angular relationship one with the other.

Each of the two main members 1 and 2 having their own independent and separate pivotal union with the centralized member 6 are thus free to adapt themselves to variable angular positions while being rotated in unison. Said member 6 being loosely confined within the embracing jaws 4, and serving as the axial center of the joint, is likewise free to adjust itself to meet and compensate for the various angular attitudes assumed by said main members, at the same time being automatically self centering.

The joint is easily disassembled by simply removing the screws 12 holding the shoes in their respective slots, which will permit separation of the several coacting elements. As the said shoes become worn they can easily and quickly be replaced by new ones, thus prolonging the life of the joint at a very nominal additional cost. I claim that a universal joint constructed in the manner heretofore described and shown in the drawings will obviate many of the weak points now prevalent in devices of this nature, special emphasis being placed on the amount of bearing surface provided, its simplicity of construction coupled with strength and great flexibility.

What I claim as my invention is:

1. In a universal joint the combination of a central pivotal member having radial flanges, the outer extremity of said flanges being curved; two connecting members each consisting of a socket for receiving a shaft, together with integral spaced-apart and alining extensions or jaws, the inner face of each jaw being slotted longitudinally to receive the flanged portions of the pivotal member; and means seated in said slots for limiting the longitudinal separation of the two connecting members.

2. In a universal joint the combination of a central pivotal member having a plurality of radial flanges whose outer extremities are arcs of a circle; two interlocking connecting members surrounding the said pivotal member, each having a socketed portion for receiving a shaft, together with integral spaced-apart and alining jaws, the inner face of each jaw being grooved longitudinally to house the flanged portions of the pivotal member; and means removably secured in the said grooves coacting with the said flanges for limiting the longitudinal separation of the two connecting members.

3. In a universal joint the combination of a central loosely positioned pivotal member having a plurality of radial flanges whose outer extremities are arcs of a circle; two interlocking connecting members surrounding the said pivotal member, each having a socketed portion for receiving a shaft together with integral spaced-apart and alining jaws, the inner face of each jaw being grooved longitudinally to receive the flanged portions of the pivotal member; and shoes removably secured in said grooves acting as a friction bearing for the said flanged portions of the pivotal member, said shoes having a curved section corresponding to the curved outer extremity of said flanges, together with a depending portion serving as a lining intermediate of the wall of said groove and contacting side of the flange.

4. In a universal joint the combination of a central pivotal member having radial flanges, the outer extremities thereof being arcs of a circle; two interlocking connecting members surrounding the said pivotal member, each having a socketed portion for receiving a shaft, together with integral spaced-apart and alining jaws, the inner face of each jaw being grooved longitudinally to receive the flanged portions of the pivotal member; shoes removably positioned within the grooves of the jaw portions, said shoes having a curved section for contact with the curved edge of said flanges, and also provided with a lubricant chamber.

In testimony whereof I affix my signature in the presence of two witnesses.

HENRY J. BUBENHEIM.

In the presence of—
M. S. THOMPSON,
H. W. STEVENSON.